United States Patent Office 2,980,651
Patented Apr. 18, 1961

2,980,651
POLYUREYLENES

John Farago, Wilmington, Del., assignor to E. I. du Pont de Nemours and Company, Wilmington, Del., a corporation of Delaware No Drawing. Filed Apr. 29, 1957, Ser. No. 655,464

11 Claims. (Cl. 260—77.5)

This invention relates to a new class of polymers and especially to shaped articles prepared from these polymers.

Polymers with improved properties are needed for such end-use applications as molded objects, films, filaments, fibers, bristles, felts, papers, woven and non-woven fabrics, and the like. Products with increased toughness, better abrasion resistance, and improved oxidative and light stability are needed. There are also many uses for thermoplastic polymers which will withstand relatively high temperatures without softening or degradation.

An object of this invention, therefore, is to provide new synthetic materials which are soluble and tractable and capable of being formed into shaped articles, such as molded objects, films, filaments, fibers, bristles, papers, felts, and similar structures. Another object is to produce materials which have outstanding abrasion resistance and toughness, which degrade less readily on exposure to oxygen and ultraviolet light, which are not highly colored, and possess better color stability. A further object is to provide linear, synthetic polymers which are particularly adapted to the preparation of filaments.

The objects of this invention are accomplished by reacting aromatic polyisocyanates with a hydrazine having a hydrogen atom on each nitrogen atom. Low molecular weight compounds with end groups containing active hydrogen atoms may be added along with hydrazine. The preferred products are the linear polymers obtained by reacting aromatic diisocyanates with hydrazine or a suitable derivative. Polymers which are elastomers at room temperature are obtained if the aromatic diisocyanates have a molecular weight between about 700 and about 8000 and melt below about 60° C. Such aromatic diisocyanates are usually polymeric in nature. The preferred elastomeric products for filament applications have melting points above about 150° C. and are usually prepared from aromatic diisocyantes having molecular weights between 800 and 2500. The elastomeric products are the subject of copending application Serial No. 556,071, filed December 29, 1955, and are accordingly claimed therein.

The products of this invention comprise polymers composed predominantly of units with the formula

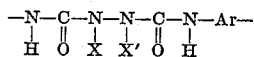

in which Ar is an aromatic radical with a molecular weight below about 450 and X and X' represent hydrogen or a monovalent organic radical, preferably a hydrocarbon or substituted hydrocarbon. The organic radicals should be free of groups capable of reacting with active hydrogen and only one of X and X' should be an aromatic radical attached directly to nitrogen, since the basicity of the nitrogen atoms is so low when both X and X' are aromatic that polymer formation is greatly retarded. The homopolymers have been termed polyureylenes to distinguish them from the polyureas, which have different structures and, consequently, different properties. Copolymers can, of course, be prepared.

The invention will be more readily understood by referring to the following examples, which are given for illustrative purposes only and should not be considered to represent the limits of the invention, since the reagents called for in the examples may be replaced by equivalent amounts of any of the other substitutes disclosed at the end of the examples.

Example 1

A solution was prepared by dissolving 0.05 mol of 4-methyl-m-phenylene diisocyanate in 50 ml. of dioxan. A second homogeneous solution was prepared by adding 0.05 mol of hydrazine sulfate and 0.10 mol of triethylamine (as an acid acceptor) to a mixture of 300 ml. dioxane and 80 ml. of water. The first solution was added all at once to the second solution in a Waring Blendor at room temperature. The polymer precipitated immediately but the slurry was stirred for five minutes at room temperature. It was filtered and the polymer which collected was boiled in water for fifteen minutes and dried in a vacuum oven at approximately 70° C. The polymer obtained had an inherent viscosity in sulfuric acid of 0.31 and a polymer melt temperature of 306° C. This polymer was soluble in formic acid, from which a film was cast.

Example 2

A solution was prepared by adding 0.05 mol of hydrazine sulfate and 0.10 mol of triethylamine to a mixture of 300 ml. dioxan and 80 ml. of water. This was placed in a Waring Blendor and a solution of 0.05 mol of methylene bis(4-phenylisocyanate) in 50 ml. of dioxan was added all at once with vigorous stirring. The product was worked up as before and the polymer obtained had an inherent viscosity of 0.46, had a polymer melt temperature of 298° C., and was soluble in sulfuric acid.

Example 3

A solution of 0.02 mol of 4-methyl-m-phenylene diisocyanate in 50 ml. of dioxan was added rapidly with vigorous stirring to a Waring Blendor containing a solution of 0.02 mol of phenylhydrazine in 150 ml. of dioxan. The reaction mixture was allowed to stand for three days at room temperature and was then worked up as in Example 1. The polymer obtained had an inherent viscosity in sulfuric acid of 0.45, a polymer melt temperature of 256° C., and was soluble in N,N-dimethylformamide.

Example 4

A solution of 5.3 grams of 4-methyl-m-phenylene diisocyanate in 20 ml. of N,N-dimethylformamide was mixed with a solution of 1 ml. of anhydrous hydrazine in 30 ml. of N,N-dimethylformamide with vigorous stirring at room temperature. A polymer with an inherent viscosity of 0.15 was obtained. A clear film was cast from a solution of this polymer, which remained flexible after 1800 hours of exposure in the fadeometer.

Example 5

A solution of 59.6 grams of 3,3'-dimethoxy-p-biphenylene diisocyanate in 300 ml. of N,N-dimethylformamide is reacted with 10 grams of hydrazine hydrate dissolved in 50 ml. of N,N-dimethylformamide. An immediate exothermic reaction occurs and the reaction mixture becomes quite viscous. After one hour a portion of the solution is cast to a clear, tough film. This film is flexible and tough after 200 hours exposure to light in the fadeometer.

The residue of the solution is extruded from a 100 hole spinneret into a 50% aqueous N,N-dimethylformamide solution. A continuous fiber is obtained, which melts with decomposition at about 290° C.

Example 6

A solution of 25 grams of methylene bis(4-phenylisocyanate) in 100 ml. of N,N-dimethylformamide is reacted with a solution of 5 grams of hydrazine hydrate in 50 ml. of N,N-dimethylformamide. An immediate exothermic reaction occurs. The reaction mixture becomes quite viscous and the polymer precipitates from solution after a half hour. The polymer will not redissolve on addition of 100 ml. of N,N-dimethylformamide with heating, but will dissolve when 20 grams of lithium chloride is added. The solution is concentrated and extruded as described in the preceding example. The fibers obtained show a decomposition temperature above 300° C. and exhibit longitudinal order when examined by X-ray techniques. The polymer has an inherent viscosity of 0.51 when measured in N,N-dimethylformamide/lithium chloride solution.

Example 7

A solution of 0.35 gram of anhydrous hydrazine in 8 ml. of dimethylsulfoxide is added to a solution of 2.57 grams of benzidine diisocyanate in 20 ml. of dimethylsulfoxide. An immediate exothermic reaction occurs and a viscous solution, which rapidly becomes grainy, is obtained. The product is transferred to water and cut in a Waring Blendor. It is soluble in N,N-dimethylformamide/lithium chloride mixtures and has an inherent viscosity of 1.60 in this solvent. The polymer melts at temperature above 400° C.

"Initial modulus" is determined by measuring the initial slope of the stress-strain curve. "Polymer melt temperature" is the minimum temperature at which a sample of the polymer leaves a wet, molten trail as it is stroked with moderate pressure across a smooth surface of a heated brass block.

The aromatic polyisocyanates used are preferably diisocyanates. Suitable aromatic diisocyanates include 4-methyl-m-phenylene diisocyanate, m-phenylene diisocyanate, p-phenylene diisocyanate, 4,4'-biphenylene diisocyanate, methylene bis(4-phenylisocyanate), 4-chloro-1,3-phenylene diisocyanate, 1,5-naphthylene diisocyanate, and 3,3'-dimethoxybenzidine diisocyanate. The diisocyanates may contain other substituents, although those which are free from reactive groups other than the two isocyanate groups are ordinarily preferred. The isocyanate groups may be attached either to the same or to different rings. Di(isocyanatoaryl) ureas such as 1,3-bis(3-isocyanato-p-tolyl) urea, and dimers of the monomeric diisocyanates may be used.

The polymers of this invention can be prepared by a variety of methods, which usually are carried out at temperatures below about 100° C. One of these methods is referred to as interfacial polymerization, which is a rapid, moderate temperature reaction in which the reactants are brought together in such a way that the reaction zone is at, or is immediately adjacent to, a liquid-liquid interface. Thus, most of the molecules of at least one of the reactants must diffuse through liquid diluent to arrive at the reaction zone. For example, the reactants in one liquid phase may be hydrazine and/or a suitable derivative or hydrazine plus another active hydrogen compound and the reactants in the other liquid phase may be one or more polyisocyanates. The two liquid phases are mixed to form a two-phase system in which the hydrazine and the polyisocyanate are in separate phases, at least one of which includes a liquid diluent. Preferably, a reactant is a liquid under the reaction conditions or is dissolved in a diluent, but one of the reactants may be dispersed or suspended as a finely divided solid in a diluent which will dissolve it at least partially. The phases are mixed until the desired condensation polymerization has taken place and then, if desired, the polymers obtained are isolated.

The polymers may also be prepared by carrying out the reaction in a homogeneous solution, as is amply demonstrated by the examples. The method used involves dissolving hydrazine and/or a suitable derivative or hydrazine plus another active hydrogen compound in a solvent and one or more aromatic polyisocyanates in separate portions of the same solvent, and then mixing the solution under conditions suitable for forming high molecular weight polymers. The molecular weight of the polymers can be controlled by the choice of the solvent medium or by the use of mixtures of appropriate solvents. The solvent is usually one which is relatively inert to the reactants. Suitable solvents for use in this process include N,N-dimethylformamide, N,N-dimethylacetamide, tetrahydrofuran, and dimethyl sulfoxide. When desired or required, the solubility of the hard non-elastic polymers formed can be increased by the addition of a solvent-improving salt, such as lithium chloride.

The hard, high melting non-elastic products obtained by reacting relatively simple low molecular weight aromatic polyisocyanates with hydrazine are tough polymers with excellent resistance to attack by solvents and chemical reagents. They are useful in many applications, such as in molded objects, films, fibers, rods, tubes, bars, etc. In this respect they are surprisingly different from the polymers prepared by reacting aliphatic diisocyanates with hydrazine. These products are insoluble and infusible and, thus, cannot be utilized for the preparation of useful shaped articles.

Conventional procedures can be used for preparing films and filaments from any of the polymers of this invention. For example, filaments can be prepared readily by dry spinning in conventional equipment. Solvents which have been found satisfactory for preparing solutions of suitable concentration for dry spinning are N,N-dimethylformamide, N,N-dimethylacetamide, tetramethylenesulfone, formic acid, and 60/40 1,1,2-trichloroethane/formic acid mixtures. As mentioned earlier, the solvent power of these organic liquids may be increased by the addition of salts, e.g., lithium chloride.

Wet spinning can also be carried out successfully. Spinning speeds are usually lower, but wet spinning processes have a definite advantage when larger denier filaments are being prepared. A preferred solvent for wet spinning is N,N-dimethylformamide, and these solutions are usually extruded into a hot water bath.

When stable dispersions of these polymers can be prepared, the dispersions can be extruded and a shaped article prepared by coagulating the dispersion and coalescing the polymer particles. In some instances heat coalescence is satisfactory, whereas for other polymers a solvent will have to be used to promote coalescence.

Shaping and polymerization can also be combined into a single step by a process which will be referred to as "chemical spinning." In this process shaped structures are obtained by combining at least two complementary reactive polymer intermediates by extruding at least one of the intermediates in liquid phase into one or more complementary polymer intermediates. This second phase may be a liquid or a vapor, but in the present case, which is limited to the reaction of aromatic polyisocyanates with hydrazine, the process will usually be restricted to extrusion of one liquid phase into another liquid phase. Either or both phases may contain a diluent. However, both phases are customarily used in as concentrated a form as possible in order to minimize the problems associated with solvent recovery.

One of the advantages of the chemical spinning process is that it provides an extra degree of freedom in the preparation of filaments and films by extrusion processes. For example, cross-linked polymers can usually not be extruded because they are relatively infusible and insoluble. Formation of cross-linked filamentary structures by after-treatment is generally unsatisfactory. However, cross-linked structures can be obtained directly by chemical spinning by use of an intermediate with a functionality greater than 2. For example, triethylenetetramine can be added to the bath along with hydrazine to provide readily available cross-linking sites along the polymer chain. Cross-linking occurs along with polymer formation and a shaped 3-dimensional structure is obtained directly. The number of cross-links will usually be restricted by using only a small percentage of the reagent with a functionality greater than 2 because a tightly cross-linked structure will not have the extensibility and flexibility usually desired in filament and film applications.

The overall properties of the films and filaments prepared from many of these polymers are improved by a cold-drawing operation. Therefore, prior to final packaging, the yarns may be drawn at a suitable draw ratio, for example, 2 to 10×, for the particular copolymer and relaxed to give a product with a desired combination of tenacity, initial modulus, yarn elongation, elasticity, and similar properties.

The polymers prepared according to this invention have many varied uses. They may be employed in the preparation of tires, belts, hose, tubing, wire and cable jackets, footwear, fibers, filaments, bristles, films, felts, papers, woven and non-woven fabrics, coated fabrics, and a wide variety of coated or molded articles.

The polymers possess a number of advantageous properties, including excellent resistance to heat and cold, direct sunlight, oxygen and ozone, oil and other hydrocarbon solvents.

Yarns of this invention have many advantages. For example, they may be spun readily as multifilament yarns and as low denier filaments. They have excellent abrasion resistance, a very low inherent color, may be dyed by common dyestuffs, need no plasticizers which might later be leached out of the yarn, and have a good resistance to perspiration, greases and many common chemicals. This application is a continuation-in-part of the copending application Farago and Frankenburg S.N. 556,072, filed December 29, 1955, now abandoned.

It will be apparent that many widely different embodiments of this invention may be made without departing from the spirit and scope thereof, and therefore it is not intended to be limited except as indicated in the appended claims.

I claim:

1. A linear polymer consisting essentially of a plurality of repeating units represented by the general formula

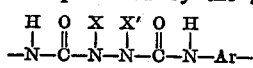

in which —Ar— is an aromatic radical selected from the group consisting of phenylene, biphenylene, and methylene-bis-phenyl radicals, said radical having not more than one substituent group selected from the group consisting of methyl, methoxy, and chloro groups attached to an annular carbon atom on any one ring with the proviso that when said radical —Ar— is phenylene the indicated free valences on said radical be attached to other than adjacent annular carbon atoms and that said substituent group be removed by at least two annular carbon atoms from one of said carbon atoms having a free valence, and that when said radical is selected from the group consisting of biphenylene and methylene-bis-phenyl the indicated free valences be in a p,p'-relationship to each other, and wherein X and X' are selected from the group consisting of hydrogen and a monovalent organic radical, said monovalent organic radical being free of active hydrogen and of groups reactive with atcive hydrogen, not more than one of X and X' being an aromatic radical attached directly to an N of the formula.

2. The polymer of claim 1 in which X and X' are H.

3. The polymer of claim 1 in which at least one X is a hydrocarbon.

4. The polymer of claim 1 having a melting point above 150° C.

5. The polymer of claim 1 in the form of a shaped article.

6. The product of claim 5 in which the shaped article is a film.

7. The product of claim 5 in which the shaped article is a filament.

8. The polymer of claim 1 in which —Ar— is the residue remaining after removal of the —NCO groups from an aromatic diisocyanate.

9. A process for preparing a linear fiber-forming polymer which comprises reacting an aromatic diisocyanate selected from the group consisting of phenylene, biphenylene, and methylene-bis-phenyl diisocyanates in which the isocyanate groups are attached to annular carbon atoms of an aromatic ring with an essentially stoichiometric amount of a hydrazine of the formula

wherein X and X' are selected from the group consisting of hydrogen and a monovalent organic radical, said monovalent organic radical being free of active hydrogen and groups reactive with active hydrogen, not more than one of X and X' being an aromatic radical attached directly to an N of the above formula, said aromatic diisocyanate having not more than one substituent group in addition to said isocyanate groups on any one ring, said substituent groups being selected from the group consisting of methyl, methoxy, and chloro groups with the proviso that when said diisocyanate is a phenylene diisocyanate said isocyanate groups be attached to other than adjacent carbon atoms and that said substituent group be removed by at least two annular carbon atoms from one of said isocyanate groups, and that when said diisocyanate is selected from the group consisting of biphenylene diisocyanate and methylene-bis-phenyl diisocyanate the isocyanate groups be in a p,p'-relationship to each other.

10. The process of claim 9 wherein said hydrazine and said aromatic diisocyanate are dissolved in separate portions of an inert solvent and thereafter the solutions obtained are admixed to provide said polymer.

11. The process of claim 10 wherein said solvent is selected from the group consisting of N,N-dimethylformamide, N,N-dimethyl acetamide, tetrahydrofuran, and dimethyl sulfoxide.

References Cited in the file of this patent

UNITED STATES PATENTS

| | | |
|---|---|---|
| 2,703,810 | Viard | Mar. 8, 1955 |
| 2,829,984 | Yaeger | Apr. 8, 1958 |
| 2,833,740 | Verblanc | May 6, 1958 |

FOREIGN PATENTS

| | | |
|---|---|---|
| 903,947 | France | Feb. 12, 1945 |
| 1,112,409 | France | Nov. 16, 1955 |
| 831,326 | Germany | Feb. 14, 1952 |
| 519,014 | Belgium | Oct. 5, 1953 |
| 54,534 | Netherlands | May 15, 1943 |
| 220,499 | Switzerland | July 16, 1942 |
| 64,333 | Netherlands | Oct. 15, 1949 |

OTHER REFERENCES

Saunders: "Chemical Reviews," vol. 43 (1948), pp. 203–218. (Copy in Sci. Lib.)

Peterson: "Liebigs Annalen der Chemie," vol. 562, pp. 205–229, only page 213 relied upon (1949). (Copy in Sci. Lib.)